Patented Oct. 30, 1934

1,978,880

UNITED STATES PATENT OFFICE 1,978,880

PRODUCTION OF COMPLEX METAL COMPOUNDS OF ORTHO-HYDROXYAZO DYESTUFFS

Fritz Lange and Hans Krzikalla, Ludwigshafen-on-the-Rhine, Germany, assignors to General Aniline Works, Inc., New York, N. Y., a corporation of Delaware No Drawing. Application April 22, 1933, Serial No. 667,497. In Germany May 10, 1932

6 Claims. (Cl. 260—12)

The present invention relates to a new process of producing complex metal compounds, especially complex chromium compounds of ortho-hydroxyazo-dyestuffs.

A process for the manufacture and production of complex metal compounds of ortho-hydroxyazo-dyestuffs has already been proposed in the Patent No. 1,765,680 which consists in treating azo dyestuffs containing alkoxy groups in ortho-position to the azo group with metal compounds capable of forming complex metal compounds of dyestuffs under conditions under which a splitting off of the alkyl radicles takes place.

We have now found that especially valuable complex chromium compounds of ortho-hydroxyazo-dyestuffs are obtained according to the said process by employing chromium sulphates under conditions under which a splitting off of the alkyl radicle takes place. Splitting off the alkyl groups is advantageously effected by heating the dyestuffs with chromium sulphates in the presence of water at temperatures above 100° C., preferably between 110° and 150° C.; the most suitable range of temperature is between 130° and 140° C. Accordingly the reaction is preferably carried out under elevated pressure. The azo dyestuffs containing chromium obtained according to this invention yield specially pure and even dyeings having excellent fastness to light.

Neutral, acid or basic chromium sulphates, or chromium sulphate liquors, as for example those obtained as by-products in processes in which bichromates or chromates are used as oxidizing agents, are suitable for the introduction of chromium.

The process according to the present invention permits of the production of valuable dyestuffs in a relatively cheap manner; no volatile acids are formed during the process which might injure parts of the apparatus and which might necessitate certain precautions to avoid injury to health. The process may be carried out in vessels lined with lead.

The following examples will further illustrate how the said invention may be carried out in practice, but the invention is not restricted to these examples. The parts are by weight.

Example 1

52 parts of the azo dyestuff derived from diazotized 4-chlor-2-amino-1-methoxybenzene and 2-hydroxynaphthalene-6,8-disulphonic acid are dissolved in 300 parts of water and heated for about 3 hours at from 130° to 135° C. in a stirring autoclave lined with lead with a solution containing 12 parts of chromium oxide, 24 parts of sulphuric acid of 66° Bé. strength and 100 parts of water. The complex chromium compound formed separates in part spontaneously. The part remaining dissolved is precipitated by the addition of hydrochloric or sulphuric acid. The chromium compound obtained yields pure violet dyeings having excellent properties as regards fastness on wool.

The solution of a basic chromium sulphate, containing for example 12 parts of chromium oxide and only 20 parts of sulphuric acid of 66° Bé. strength, may also be employed for the introduction of chromium.

Example 2

52 parts of the azo-dyestuff derived from diazotized 4-chlor-2-amino-1-methoxybenzene and 1-hydroxynaphthalene-3,8-disulphonic acid are dissolved in 800 parts of water and heated for about 3 hours at from 130° to 140° C. in a stirring autoclave lined with lead with a solution containing 12 parts of chromium oxide, 28 parts of sulphuric acid of 66° Bé. strength and 200 parts of water. The chromium compound formed is then salted out in the usual manner. It yields blue dyeing on wool and silk.

Example 3

54 parts of the dyestuff obtainable by coupling diazotized 5-nitro-4-methyl-2-amino-1-methoxybenzene with 1-hydroxynaphthalene-4,8-disulphonic acid are dissolved in about 250 parts of water and heated with an aqueous solution of chromium sulphate (consisting of 100 parts of water, 19 parts of sulphuric acid of 66° Bé. and 12 parts of chromium oxide) in a stirring autoclave lined with lead. The temperature is maintained for 1 hour at 125° C., for another hour at 130° C. and then for 1 hour at 135° C. The chromium compound thus formed is salted out by means of sodium chloride in the usual manner. It dyes wool and silk deep navy blue shades.

Example 4

54 parts of the dyestuff obtainable by coupling diazotized 1-methoy-2-amino-4-methyl-5-nitrobenzene with 2-hydroxynaphthalene-6,8-disulphonic acid are dissolved in about 250 parts of water and heated with an aqueous solution of chromium sulphate (consisting of 100 parts of water, 19 parts of sulphuric acid of 66° Bé. and 12 parts of chromium oxide) in a stirring autoclave lined with lead. The temperature is maintained for 1 hour at 125° C., for another hour at 130° C. and then for 1 hour at 135° C. The chromium compound thus formed is salted out by means of sodium chloride in the usual manner. It dyes wool and silk blue violet shades.

What we claim is:—

1. The process of producing complex chromium compounds of ortho-hydroxyazo-dyestuffs, which comprises treating an azo-dyestuff containing an alkoxy group in ortho-position to the azo group, with a sulphate of chromium, in the presence of water at temperatures above 100° C.

2. The process of producing complex chromium compounds of ortho-hydroxyazo-dyestuffs, which comprises treating an azo-dyestuff containing an alkoxy group in ortho-position to the azo group, with a sulphate of chromium, in the presence of water at temperatures above 100° C. under elevated pressure.

3. The process of producing complex chromium compounds of ortho-hydroxyazo-dyestuffs, which comprises treating an azo-dyestuff obtainable by diazotizing a benzene derivative containing in ortho-position to one another an amino and an alkoxy group and coupling with a naphthol-disulphonic acid, with a sulphate of chromium, in the presence of water at temperatures above 100° C.

4. The process of producing complex chromium compounds of ortho-hydroxyazo-dyestuffs, which comprises treating the azo-dyestuff obtainable by coupling diazotized 4-chlor-2-amino-1-methoxybenzene with 2-hydroxynaphthalene-6,8-disulphonic acid, with a sulphate of chromium, in the presence of water at temperatures above 100° C.

5. The process of producing complex chromium compounds of ortho-hydroxyazo-dyestuffs, which comprises treating the azo-dyestuff obtainable by coupling diazotized 4-chlor-2-amino-1-methoxybenzene with 1-hydroxynaphthalene-3,8-disulphonic acid, with a sulphate of chromium, in the presence of water at temperatures above 100° C.

6. The process of producing complex chromium compounds of ortho-hydroxyazo-dyestuffs, which comprises treating the azo-dyestuff obtainable by coupling 5-nitro-4-methyl-2-amino-1-methoxybenzene with 1-hydroxynaphthalene-4,8-disulphonic acid, with a sulphate of chromium, in the presence of water at temperatures above 100° C.

FRITZ LANGE.
HANS KRZIKALLA.